United States Patent [19]
Pattengill et al.

[11] Patent Number: 5,329,880
[45] Date of Patent: Jul. 19, 1994

[54] CLUMPABLE ANIMAL LITTER

[75] Inventors: Maurice G. Pattengill, Golden; Jerry D. Glynn, Aurora; Martin A. Jones, Boulder, all of Colo.

[73] Assignee: Western Aggregates Inc., Boulder, Colo.

[21] Appl. No.: 108,950

[22] Filed: Aug. 18, 1993

[51] Int. Cl.$^5$ ............................................. A01K 29/00
[52] U.S. Cl. ..................................................... 119/171
[58] Field of Search ................................. 119/171, 173

[56] References Cited

U.S. PATENT DOCUMENTS

| | | | |
|---|---|---|---|
| Re. 33,983 | 7/1992 | Hughes | 119/173 |
| 4,315,761 | 2/1982 | Larrson | 71/21 |
| 4,437,429 | 3/1984 | Goldstein et al. | 119/1 |
| 4,685,420 | 8/1987 | Stuart | 119/1 |
| 4,704,989 | 11/1987 | Rosenfeld | 119/173 |
| 4,827,665 | 5/1989 | Hubbs, Jr. et al. | 47/58 |
| 5,129,365 | 7/1992 | Hughes | 119/173 |
| 5,152,250 | 10/1992 | Loeb | 119/171 |
| 5,216,980 | 6/1993 | Kiebke | 119/173 |

FOREIGN PATENT DOCUMENTS

| | | |
|---|---|---|
| 3620447 | 12/1987 | Fed. Rep. of Germany . |
| 219323 | 9/1988 | Japan . |
| 1191626 | 8/1989 | Japan . |

*Primary Examiner*—Thomas Price
*Attorney, Agent, or Firm*—Blake T. Biederman; Edward A. Steen

[57] ABSTRACT

The invention provides a waterproof litter receptacle for use in disposal of animal waste products. The litter receptacle contains a mixture of non-smectitic, hydrophilic shale aggregate. The mixture of non-smectitic hydrophilic shale has a fraction of coarse material with a size less than about 5 mesh (4000 microns). The mixture has the property of agglomerating into a clump upon contact with urine. The agglomerated clump of shale and urine is removable with a perforated scoop. A substantially dust-free distribution of shale of greater than 50 mesh (300 microns) is capable of clumping without additives. Optionally, the shale may contain up to 10 weight percent clumping agent selected from the group of water absorbent polymers, corn starch, gelatin, gluten and dried plants of the Plantago family. In addition 5 to 25 wt % ammonia absorbing zeolite may be added for odor control.

25 Claims, No Drawings

CLUMPABLE ANIMAL LITTER

This invention relates to litter materials useful for agglomerating liquid animal waste and coating moist, solid animal waste to form surface dry, coherent clumps of disposable material.

BACKGROUND OF THE INVENTION

Traditionally, water-absorbent clays have been relied on for use as animal litters. The problem with certain of these conventional water-absorbent clays is that some tend not to absorb noxious odors as the waste products biologically break down. Eventually, as the waste products accumulate, the odor increase requires that the entire litter charge be replaced.

Recently, "clumpable" animal litters have become a popular method of reducing the build up of waste odors. With clumpable animal litters, urine is agglomerated with an absorbent material into a clump of material that may physically be removed from an animal litter box. Provided the urine clumps and other waste products are periodically scooped away, saturation of objectionable odors is avoided. This clumping aspect also allows only the specific litter affected to be removed, thus a bulk of the litter charge is retained for subsequent use.

To date, there have been essentially two types of clumpable animal litters. The first type of clumpable animal litter contains predominately smectite or other hydrophilic clay types such a bentonite or palygorskite group clays. An example of a bentonite clay-containing cat litter is provided by J. Hughes in U.S. Pat. No. 5,129,365. A problem with smectite clays is that some pet owners ignore instructions not to flush the clumps down a toilet. Water-swellable clays that have a tendency to increase as much as 10 to 14 times by volume can cause severe sewer problems if introduced or concentrated in large enough quantities. Another potential problem with clay-based clumpable animal litters is "dusting" that occurs during the pouring of the litters into the litter box container.

Several additives for improving clumpability of smectite clay have been proposed. G. A. Stuart, in U.S. Pat. No. 4,685,420, discloses the use of a particulate water absorbent polymer in combination with a clay based animal litter for agglomeration. Similarly, T. Fujimori, in Japanese Pat. Publication No. 1-191626 discloses use of an acrylic acid vinyl alcohol copolymer or a sodium acrylate polymer, powdered paper and bentonite mixture for forming clumpable animal litters. Finally, T. M. Kiebke, in U.S. Pat. No. 5,216,980, has recently disclosed use of a semolina additive to clay particles for creating a clumpable cat litter. However, these clays continue to rely upon water swellable clay as the base material.

In addition to the clay based animal litters, alternate clumpable mixtures have been proposed. For example, H. Wakamiya, in Japanese Pat. Publication No. 63-219323 discloses a mixture of sand and at least 15 wt % ferrous sulfate monohydrate for forming removable clumps. H. R. Loeb, in U.S. Pat. No. 5,152,250, discloses use of granulated peanut shells, flour and mineral oil for holding the mixture together. It is believed that these clay alternatives have not been commercially successful.

It is an object of this invention to provide a smectite-free clumpable cat litter.

It is a further object of the invention to provide an all natural clumpable animal litter.

It is a further object of the invention to provide a substantially dust-free animal litter.

It is a further object of this invention to provide an animal litter capable of forming durable removable clumps in a few minutes.

SUMMARY OF INVENTION

The invention provides a waterproof litter receptacle for use in disposal of animal waste products. The litter receptacle contains a mixture of hydrophilic shale aggregate. The mixture of hydrophilic shale has a fraction of coarse material with a size less than about 5 mesh (4000 microns). The mixture has the property of agglomerating into a clump upon contact with urine and certain other fluids. The agglomerated clump of shale and urine is removable with a perforated scoop. A substantially dust-free distribution of shale of greater than 50 mesh (300 microns) is capable of clumping without additives. Optionally, the shale may contain up to 10 weight percent clumping agent selected from the group of absorbent polymers, corn starch, gelatin, gluten and dried plants of the Plantago family. Specifically, 0.025 to 5 wt % dried plantago plant may be added for improved clumpability. In addition 5 to 25 wt % ammonia absorbing zeolite may be added for odor control.

DESCRIPTION OF PREFERRED EMBODIMENT

It has been discovered that a mixture of hydrophilic raw shale particles provides a clumpable cat litter substantially free of smectite clays or additives. For purposes of this specification, raw shale is defined as hydrophilic shale aggregate that agglomerates upon contact with liquids including urine. Furthermore, the shale remains clumpable even when fine "dust" material has been screened away. Optionally, additives may be added to the shale for odor control, bulk density control or improved clumpability.

Commercial clumpable animal litters (Table 1, Samples 1-11) and shale/zeolite/plantago mixture (Table 1, Sample 12) were tested with respect to bulk density, resistance to attrition and clumpability. Composition of sample 12 was air dried 79.2 wt % raw shale with a dry screened size of $-8+30$ mesh ($-2360+600$ microns), 19.8 wt % zeolite, and 1.0% plantago clumping agent. The shale originated from Pierre shale mined an processed by Western Aggregates, Inc., 11728 Highway 93, Boulder Colo., 80303. The zeolite was primarily clinoptilolite originating from Rocky Mountain Zeolites and the plantago was Stabilizer TM sold by Stabilizer, Inc. Bulk density was calculated by pouring material into a 250, 500, or 1,000 ml transparent glass or plastic graduated cylinder or a 1/10 ft$^3$ (2,832 cm$^3$) or a ¼ ft$^3$ (7,079 cm$^3$) bucket, i.e., the largest container that could be used in view of the size of the sample available was used for each test. The weight of the sample per unit volume was then calculated to determine the bulk density of the sample. Resistance to attrition was obtained by dry screening a $-6+30$ mesh ($-3350+600$ micron) fraction of each sample. A 50 gram sample and 300 steel balls approximately ¼ in. (0.64 cm) diameter, and weighing approximately 355 grams, were placed into an 8" (20 cm) diameter brass screen pan, then into a Ro-Tap shaking machine for 20 minutes. The percent passing a 100 mesh screen (150 micron) after 20 minutes of grinding was measured to simulate the breakdown of the sample during shipping and handling, and to produce comparative data regarding the commercial products tested.

Clumpability was tested by placing a 200±1 gram samples in a 3 in. (7.6 cm) diameter container having a height of 3½ in. (8.9 cm). Then 8±0.1 ml of distilled water was introduced through a Pyrex ® 2122A, 50 ml buret, with stopcock, at the maximum rate allowed by the buret, to form a clump. After a time of either 3 minutes or 4 hours, the clump produced was placed onto a perforated litter scoop and shaken laterally left to right for ten seconds with a right to left cycle time of one second. After shaking, the clumps were rated by the following criteria:

| RATING | DESCRIPTION |
| --- | --- |
| 3 | After testing the clump is in one piece with little or no degradation. |
| 2 | As above, but noticeable degradation is apparent on edges (etc.). |
| 1 | The clump breaks into several pieces during testing, but the pieces are reasonably durable |
| <1 | The clump breaks down during testing into small pieces with no recognizable strength characteristics. |

(All of the above tests were performed at 20° C.). Results of bulk density, attrition and clumpability ratings are provided below in Table 1.

TABLE 1

| SAMPLE NO. | BULK DENSITY Lb/Ft³ | BULK DENSITY g/cm³ | RESISTANCE TO ATTRITION (% LOSS) | CLUMPABILITY[4] AFTER 3 MIN. | CLUMPABILITY[4] AFTER 4 HRS. |
| --- | --- | --- | --- | --- | --- |
| 1 | 69.3 | 1.11 | 2.0 | 3 | 3 |
| 2 | 53.4 | 0.86 | 3.0 | 3 | 3 |
| 3 | 50.6 | 0.81 | 5.4 | ND | ND |
| 4 | 52.2 | 0.84 | 4.2 | ND | ND |
| 5 | 41.6[1] | 0.66 | 3.2 | 2 | 3 |
| 6 | 57.8 | 0.93 | 1.6 | 3 | 3 |
| 7 | 66.4 | 1.06 | 3.0 | 3 | 3 |
| 8 | 63.9[2] | 1.02 | 0.8 | 3 | 3 |
| 9 | 63.4 | 1.02 | 0.6 | 3 | 3 |
| 10 | 74.0[3] | 1.18 | 0.4 | 3 | 3 |
| 11 | ND | ND | ND | 3 | 3 |
| 12 | 75.3 | 1.20 | 3.2 | 3 | 3 |

ND = Not Determined
[1]Average of 41.4 and 41.7
[2]Average of 66.4 and 61.4
[3]Average of 77.8 and 70.2

An x-ray mineralogical comparison, by weight percent, of commercial clumping clay animal litter (samples 1, 2, 8, 10) and raw shale (sample 12), is provided in Table 2 below:

TABLE 2

| MINERAL | 1 | 2 | 8 | 10 | 12 |
| --- | --- | --- | --- | --- | --- |
| SMECTITE | 70 | 30 | 60 | 75 | — |
| MICA/ILLITE | — | — | <5 | <5 | 15 |
| PALYGORSKITE | — | 50 | — | — | — |
| KAOLINITE | — | — | <5 | — | — |
| CHLORITE | — | — | — | — | 15[2] |
| QUARTZ | 15 | 5 | 7 | 10 | 20 |
| CRISTOBALITE[1] | — | <5? | 13 | — | — |
| PLAGIOCLASE FELDSPAR | 5 | — | <5 | <5 | 8 |
| K-FELDSPAR | <3 | <5 | <3 | — | 5 |
| CLINOPTILOLITE | <5 | — | <5 | <3 | — |
| CLINOPYROXENE | — | — | — | — | — |
| CALCITE | — | <3 | — | <3 | <5 |
| DOLOMITE | — | <5 | — | — | — |
| SIDERITE | — | <3 | — | — | — |
| GYPSUM | — | — | <3 | <2 | — |
| ANALCIME | — | — | — | <3 | — |
| "AMORPHOUS" | — | — | — | — | 20–30 |
| "UNIDENTIFIED" | <5 | <5 | <5 | <5 | <5 |

[1]This phase fits the available "JCPDS" (Joint Committee on Powder Diffraction Standards) data for cristobalite. However, a controversy exists over whether this phase (occurring in clay samples) is truly cristobalite or an "opaline silica" such as opal-ct. Opal-ct has been defined as "microcrystalline cristobalite" in a matrix of amorphous silica, but this definition is now being questioned. The term "opaline" implies that the phase is hydrated and may not be crystalline or entirely crystalline.
[2]May include a minor amount of kolinite.

From the data in Tables 1 and 2, it is apparent that a raw shale mixture (sample 12) provided clumpability of equal or superior performance without the use of smectite clay. Commercial products 1–4 and 6–11 were all believed to be smectite based clumpable cat litters. The composition of sample number 5 is advertised as containing no water-swellable clays. Table 2 above illustrates the unique mineralogical characteristics of the raw shale.

In addition, a drying test was performed on raw shale to evaluate clumpability of various size distributions under different drying conditions. Results are provided below in Table 3.

TABLE 3

| Size Distribution (Mesh) | Drying Temp. °F. | Drying Temp. °C. | Moisture Content (wt %) | After 3 Min. (in cup) | After 8 hrs. (in cup) | After 8+ hrs. (in air) |
| --- | --- | --- | --- | --- | --- | --- |
| −8 + 16 (−2360 + 1180μ) | 500 | 260 | 0 | 0 | 0 | 0 |
| −16 + 30 (−1180 + 600μ) | 500 | 260 | 0 | 0 | 0 | 0 |
| (1) | 500 | 260 | 0 | 0 | 0 | 0 |
| (1) | 300 | 149 | 0 | 3.0 | 3.0 | 3.0 |
| (1) | 300 | 149 | 2 | 2.0 | 3.0 | 3.0 |
| (1) | 300 | 149 | 4 | 2.5 | 3.0 | 3.0 |
| (1) | 300 | 149 | 6 | 2.5 | 3.0 | 3.0 |
| (1) | 300 | 149 | 8 | 2.5 | 3.0 | 3.0 |
| (1) | Room Temp | | 9.35[2] | 2.5 | 3.0 | 3.0 |

(1) 50% −8 + 16 mesh (−2360 + 1180μ) + 50% −16 + 30 mesh (−1180 + 600μ)
[2]Air Dried Material Raw shale with as high as 9.4% moisture effectively clumped without additive. During the above testing, it was observed that clumping generally improved with decreased moisture content, provided the shale was dried at a low enough temperature. It is advantageous for the moisture content of the raw shale to be less than 10 weight percent. Most advantageously, less than 5 weight percent moisture is present in the raw shale.

When the raw Pierre shale of Western Aggregates is dried at a temperature of 500° F. (260° C.), it tends to lose its ability to agglomerate. However, shale dried at a temperature of 300° F. (149° C.) does not lose its ability to agglomerate. For purposes of this specification, shale heated to a temperature wherein it looses its agglomerating ability is not considered raw shale.

Table 4 below contains size distribution of commercial clumpable animal litters, (samples 1–11) and the preferred gradation (sample no. 12) for the preferred −8+30 mesh (−2360+600 micron) raw shale/zeolite mix without additives.

TABLE 4

| SAMPLE NO. | CUMULATIVE % PASSING SCREEN SIZE (MESH) | | | | | | | | | |
|---|---|---|---|---|---|---|---|---|---|---|
| | 4 (4750μ) | 6 (3350μ) | 8 (2360μ) | 10 (2000μ) | 16 (1180μ) | 30 (600μ) | 50 (300μ) | 100 (150μ) | 200 (75μ) | F.M. (1) |
| 1 | 100.0 | 100.0 | 100.0 | 100.0 | 94.9 | 54.1 | 16.3 | 2.1 | 0.5 | 2.3 |
| 2 | 100.0 | 100.0 | 100.0 | 100.0 | 96.3 | 59.7 | 7.6 | 1.3 | 0.5 | 2.4 |
| 3 | 100.0 | 100.0 | 100.0 | 100.0 | 96.3 | 57.3 | 9.3 | 0.9 | 0.3 | 2.4 |
| 4 | 100.0 | 100.0 | 100.0 | 99.8 | 95.6 | 55.3 | 8.2 | 1.9 | 0.8 | 2.4 |
| 5 | 100.0 | 100.0 | 99.9 | 99.7 | 97.7 | 47.5 | 9.5 | 3.1 | 2.1 | 2.4 |
| 6 | 100.0 | 100.0 | 99.9 | 99.9 | 93.8 | 46.3 | 7.4 | 0.9 | 0.4 | 2.5 |
| 7 | 100.0 | 100.0 | 100.0 | 100.0 | 99.0 | 37.1 | 5.1 | 1.6 | 0.7 | 2.6 |
| 8 | 100.0 | 100.0 | 98.5 | 96.4 | 73.9 | 20.9 | 4.7 | 3.0 | 2.1 | 3.0 |
| 9 | 100.0 | 99.0 | 99.0 | 83.8 | 54.8 | 19.4 | 3.5 | 2.2 | 1.3 | 3.4 |
| 10 | 100.0 | 100.0 | 92.2 | 73.2 | 3.3 | 0.2 | 0.2 | 0.2 | 0.2 | 4.3 |
| 11 | 100.0 | 100.0 | 100.0 | 100.0 | 99.1 | 26.8 | 0.8 | 0.2 | 0.1 | 2.7 |
| 12 | 100.0 | 100.0 | 100.0 | 25.0 | 25.0 | 50.0 | 0.0 | 0.0 | 0.0 | 0.0 |

(1) The Fineness Modules (F.M.) values noted were calculated by summing the percents retained on the 4 mesh (4750μ) through the 100 mesh (150μ) screens and dividing the sum total by 100.

The raw shale mixture (sample 12) consisted of 50% −8+16 mesh (−2360+1180 microns) and 50% −16+30 mesh (−1180+600 microns).

As shown above the raw shale clumpable mixture may be produced with no material less than 50 mesh (300 microns) in size. This low amount of "fines" provides for a substantially dust-free clumpable cat litter. However, if desired for cost considerations, fine material may remain in the mixture without adversely impacting clumping properties.

To lower bulk density, −16+50 mesh (−1180+300 microns) lightweight heat expanded porous shale was mixed with −16+50 mesh (−1180+300 microns) raw shale for testing. Table 5 provides initial results obtained with porous, expanded shale additions.

TABLE 5

| PARTICLE SIZE | | WT % | COMPONENT | CLUMPABILITY RATING (3 = BEST; <1 = WORST) | | |
|---|---|---|---|---|---|---|
| mesh | micron | | | 3 MIN. (AIR) | 4 HR. (AIR) | 4 HR. (CUP) |
| −16 + 50 | −1180 + 300 | 50 | R.S. | 1.5 | <1 | <1 |
| −16 + 50 | −1180 + 300 | 50 | L.W. | | | |
| −16 + 50 | −1180 + 300 | 80 | R.S. | 2.3 | 2.6 | 2.7 |
| −16 + 50 | −1180 + 300 | 20 | L.W. | | | |
| −8 + 16 | −2360 + 1180 | 50 | R.S. | <1 | 2.7 | <1 |
| −8 + 16 | −2360 + 1180 | 50 | L.W. | | | |
| −8 + 16 | −2360 + 1180 | 80 | R.S. | 2.8 | 3.0 | 2.6 |
| −8 + 16 | −2360 + 1180 | 20 | L.W. | | | |
| −8 + 16 | −2360 + 1180 | 25 | R.S. | <1 | <1 | <1 |
| −16 + 50 | −1180 + 300 | 25 | R.S. | | | |
| −8 + 16 | −2360 + 1180 | 25 | L.W. | | | |
| −16 + 50 | −1180 + 300 | 25 | L.W. | | | |

R.S. = Raw Shale
L.W. = Porous Shale

From the above Table it is apparent that up to 20% porous expanded shale may be added to the hydrophilic raw shale without substantially decreasing clumpability. Optionally up to 25 wt % porous shale may be added for reducing bulk density. Porous, expanded shale is produced by heating shale to a temperature of about 2000° F. (1093° C.) wherein the shale partially melts and water vapor and other gases expand within the shale to produce porosity. The bulk density of porous shale is typically less than 0.8 g/cm$^3$ (49.9 lb/cu.ft.). This 0.8 g/cm$^3$ (49.9 lb/cu.ft.) porous shale could be used to significantly lower the bulk density of raw shale that is typically about 1.2 g/cm$^3$ (74.9 lb/cu.ft.).

The raw shale has an inherit ability to form clumps without additives. However, up to 10 wt % clumping agents such as water absorbent polymers, corn starch, gelatin, gluten and dried plants of the Plantago family may be added for improved clumpability. Additives such as gelatin and corn starch may provide a small improvement in clumping properties. However, the improvement in performance from corn starch or gelatin would be rather expensive. Specifically, dried plantago in an amount of 0.25 to 5% by weight provides improved clumpability without an unreasonable increase in cost. Most advantageously, dried plantago is limited to 2 wt %.

Alternatively, ammonia absorbing zeolite in amounts of 5 to 25 weight percent may be added for odor control. The zeolite absorbs ammonia to reduce transfer of ammonia carried odors. The zeolite provides a neutral contribution to clumpability of the animal litter.

Advantageously, the porous shale is screened to remove fines that tend to cause dusting during pouring. Limiting the shale to +30 mesh (600 microns) or 50 mesh (300 microns) tends to provide effective dust control. The most preferred size distribution is −5 mesh (4,000 microns) or −8 mesh (2360 microns) to +30 mesh (600 microns) or +50 mesh (300 microns). These coarse shales have the unexpected ability to agglomerate without the use of fines or smectite clay. However, smectite clay may be present if desired or as an impurity of raw shale.

The clumpable hydrophilic raw shale animal litter of the invention provides several advantages. The raw shale provides a mixture that will agglomerate without smectite clay or expensive additives. The raw shale may be combined with zeolite for odor control or porous, expanded shale to lower density. Furthermore, the mixture has clumpable properties in the absence of fines that cause "dusting" problems. Finally, the raw shale may be combined with dried plantago to produce rather strong durable natural clumps that may be easily removed with minimal breakage or loss.

While in accordance with the provisions of the statute, there is illustrated and described herein specific embodiments of the invention. Those skilled in the art will understand that changes may be made in the form of the invention covered by the claims and the certain features of the invention may sometimes be used to advantage without a corresponding use of the other features.

The embodiments of the invention in which an exclusive property or privilege is claimed are defined as follows:

1. A waterproof litter receptacle for use in disposal of animal waste products, said litter receptacle containing a mixture of hydrophilic shale aggregate, said mixture of hydrophilic shale having a fraction of coarse material with a size less than at least about 5 mesh (4000 microns), said mixture having the property of agglomerating into a clump upon contact with urine, and the clump of agglomerated shale and urine being capable of physical removal with a perforated scoop.

2. The litter receptacle of claim 1 wherein said mixture of shale contains up to 10 weight percent clumping agent for improved clumpability.

3. The litter receptacle of claim 2 wherein said clumping agent is selected from the group consisting essentially of water absorbent polymers, corn starch, gelatin, gluten and dried plants of the Plantago family.

4. The litter receptacle of claim 1 wherein said mixture of shale contains 0.025-5% by weight percent dried plantago agglomerating agent.

5. The litter receptacle of claim 1 wherein said mixture of shale contains 5 to 25% by weight ammonia absorbing zeolite.

6. The litter receptacle of claim 5 wherein said zeolite is clinoptilolite.

7. The litter receptacle of claim 1 wherein said mixture contains up to 25 weight percent porous shale for reducing bulk density.

8. The litter receptacle of claim 1 wherein said shale has a size substantially greater than about 50 mesh (300 microns).

9. A waterproof litter receptacle for use in disposal of animal waste products, said litter receptacle containing a mixture of hydrophilic shale aggregate, said mixture of hydrophilic shale having a fraction of coarse material with a size consisting essentially of less than at least about 5 mesh (4000 microns) and greater than 50 mesh (300 microns), said mixture having the property of agglomerating into a clump upon contact with urine, and the clump of agglomerated shale and urine being capable of physical removal with a perforated scoop.

10. The litter receptacle of claim 9 wherein said mixture of shale contains up to 10 weight percent clumping agent for improved clumpability.

11. The litter receptacle of claim 10 wherein said clumping agent is selected from the group consisting essentially of water absorbent polymers, corn starch, gelatin, gluten and dried plants of the Plantago family.

12. The litter receptacle of claim 9 wherein said mixture of shale contains 0.025-5% by weight percent dried plantago agglomerating agent.

13. The litter receptacle of claim 9 wherein said mixture of shale contains 5 to 25% by weight ammonia absorbing zeolite.

14. The litter receptacle of claim 13 wherein said zeolite is clinoptilolite.

15. The litter receptacle of claim 9 wherein said mixture contains up to 25 weight percent porous shale for reducing bulk density.

16. A method of controlling disposal of animal waste comprising the step of:
   providing a litter container capable of holding animal litter,
   introducing a layer of hydrophilic raw shale into said container,
   allowing an animal to urinate on said hydrophilic raw shale to form an agglomeration of hydrophilic raw shale and urine, and
   removing the agglomeration of hydrophilic raw shale and urine as a clump from said litter container.

17. The method of claim 16 wherein up to 10 weight percent clumping agent selected from the group consisting essentially of water absorbent polymers, corn starch, gelatin, gluten and dried plants of the Plantago family is introduced with said hydrophilic raw shale into said container.

18. The method of claim 16 wherein 0.025 to 5% by weight dried plants of the Plantago family is introduced with said hydrophilic raw shale into said container.

19. The method of claim 16 wherein 5 to 25% by weight ammonia absorbing zeolite is introduced with said hydrophilic raw shale into said container.

20. The method of claim 16 wherein said hydrophilic raw shale introduced into said litter container has a size greater than about 50 mesh (300 microns).

21. An animal litter comprising hydrophilic raw shale having a particle size less than 5 mesh (4000 μm) and 0.025 to 10 weight percent dried plantago plant, said mixture of raw shale and plantago plant being capable of agglomerating with urine to form removable clumps.

22. The animal litter of claim 21 wherein said animal litter contains up to 5 weight percent dried plantago plant.

23. The animal litter of claim 21 wherein said animal litter contains up to 2 weight percent dried plantago plant.

24. The animal litter of claim 21 containing 5 to 25 weight percent ammonia absorbing zeolite.

25. The animal litter of claim 21 wherein said raw shale primarily has a mesh size above 50 mesh (300 microns) for removing dust.

* * * * *